United States Patent [19]
Kawachi

[11] Patent Number: 4,887,918
[45] Date of Patent: Dec. 19, 1989

[54] DRAWN CUP ROLLER BEARING
[75] Inventor: Takayuki Kawachi, Mino, Japan
[73] Assignee: Nippon Thompson Co., Ltd., Tokyo, Japan
[21] Appl. No.: 323,193
[22] Filed: Mar. 13, 1989

Related U.S. Application Data
[63] Continuation of Ser. No. 65,873, Jun. 24, 1987, abandoned.

[30] Foreign Application Priority Data
Dec. 19, 1986 [JP] Japan .................. 61-194422
[51] Int. Cl.$^4$ .............................................. F16C 33/58
[52] U.S. Cl. ..................................... 384/560; 384/569
[58] Field of Search ............... 384/560, 565, 569, 564, 384/559

[56] References Cited
U.S. PATENT DOCUMENTS
4,523,362 6/1985 Cuozzo et al. ..................... 384/560

Primary Examiner—Lenard A. Footland
Attorney, Agent, or Firm—Rogers & Killeen

[57] ABSTRACT

A drawn cup roller bearing consisting of an annular outer ring and a plurality of rollers assembled therewith is provided, wherein said annular outer ring has at each of its axially opposite ends, an inside integral flange with an inwardly projecting roller-retaining edge at its free end thereby to form an internal peripheral annular space in the outer ring capable of retain a number of rollers in side-by-side relation, while at each of the ends of the roller is provided an end projection having a concave sidewall and a generally trapezoidal vertical section viz., so-called dumbbel type roller, which is adapted to be held by said inwardly projecting roller-retaining edges so that a number of rollers are freely and movably held on the internal peripheral annular space formed in the annular outer ring by the opposing inwardly projecting edges without fear of coming off therefrom even in the absence of a shaft to be received in the annular outer ring. Due to the unique structure of the present invention, the present drawn cup roller bearing has a greater roller retaining capacity, and even when the shaft has been removed from central opening of the annular outer ring, the rollers do not come off from the outer ring in which they are fully and movably held, while any part of the bearing does not require any strict dimensional accuracy in the manufacture and, further, the rollers can be assembled easily in the annular outer ring and due to a simple construction, the production cost of the bearing as a whole can be greatly reduced.

8 Claims, 4 Drawing Sheets

A U-SHAPED ROLLER-INSERTING GROOVE

A DOVETAIL ROLLER-INSERTING GROOVE

AUXILIARY GROOVES MADE ON THE BOTH SIDES OF THE ROLLER-INSERTING GROOVE

DRAWN CUP ROLLER BEARING

This is a continuation of application Ser. No. 065,873, filed June 24, 1987, abandoned.

BACKGROUND OF THE INVENTION

1. Field of the Invention

The present invention relates to a drawn cup roller bearing or needle roller bearing, more specifically to a full-roller type roller bearing consisting of an annular outer ring or an outer shell, a shaft received therein and a plurality of rollers intervening therebetween, wherein even if the shaft is removed from the internal opening of the annular outer shell, the rollers will not come off from the annular outer ring.

2. Description of the Prior Arts

A drawn cup or needle roller bearing of a conventional type is shown in FIG. 5, wherein 1 is a shaft, 2 is an annular outer ring, for receiving said shaft within the central opening thereof, and 3 is rollers intervening therebetween.

In the conventional roller bearing, the roller 3 is shaped at each of the opposing end portions as a truncated conical configuration, while the annular outer ring 2 has an inwardly projecting roller-retaining edge 5 formed at the free end of each of the inside flanges which are integrally formed at both axial ends of the annular outer ring 2, thus each of the rollers 3 is retained on the inner surface of the internal peripheral sidewall of the annular outer ring 2 with the sloped sidewall 6 of each of the truncated conical-shaped ends 4 of the roller 3 being supported on the inwardly projecting roller-retaining edge 5.

In such a conventional roller bearing having an annular outer ring, however, the axial length of the inwardly projecting roller-retaining edge 5 is so short that to insure a stable retention of rollers thereby, the dimension and shape of the inwardly projecting edge must be accurately controlled in the working thereof, otherwise if the central shaft is removed from the central opening of the annular outer ring and then the rollers are inclined even slightly with the outer ring, it may happen that some of the bearing rollers easily come off from the annular outer ring 2, as indicated by the dotted line in FIG. 6. And when rollers 3 are to be assembled into the annular outer-ring 2, several rollers remaining to be yet assembled must each be forcibly pressed against at least one of the inwardly projecting roller-retaining edges into the roller-retaining, internal peripheral annular space of the annular outer ring so that referring to FIG. 6, the tilted roller depicted by the dotted line can be placed into the position depicted by the solid line. thus, not only end portions of the rollers but also inwardly projecting roller-retaining edges of the outer ring flanges adapted to be contacted with said roller ends are liable to be damaged or broken due to the necessary forcible pressure.

As stated above, in the conventional roller bearing, axial length each of inwardly projecting roller-retaining edges of the outer ring flange is so short that the dimension and shape of the product bearing must be strictly accurate for insuring stable assembling of rollers into the roller-retaining internal peripheral annular space of the annular outer ring. Therefore, the working efficiency involved must be naturally decreased with the production rate of defective bearings being increased. Accordingly, shell-type bearings that should have suitably been manufactured usually on a mass-production basis unexpectedly requires high manufacturing cost.

SUMMARY OF THE INVENTION

The present device has been made in view of such problems of the conventional art as mentioned above, aiming at providing a drawn cup or needle roller bearing featured by a greater roller-retaining capacity, while one can easily arrange rollers into the internal peripheral annular space formed by the opposing outer ring flanges of a bearing with a simple structure and low production cost.

In order to attain the above objects, the present invention comprises an annular outer ring made of a thin steel sheet and a number of rollers arranged closely side by side in the internal peripheral annular space formed by the opposing outer ring flanges, wherein each of the rollers has, at each of the opposite ends, an end projection having a concave sidewall and a generally trapezoidal vertical cross section with the greatest diameter smaller than the diameter of the roller, viz., so-called dumbbel type roller, a pair of inside flanges are integrally formed at the axially opposite ends, respectively, of the annular outer ring, each with an inwardly projecting roller-retaining, edge being formed at and along each of the free ends of said annular inside flanges thereby forming an internal peripheral annular space in the annular outer ring capable of retaining the rollers therein in a filled-up fashion with their end projections supported by said inwardly projecting roller-retaining edges, and a roller-inserting groove is formed in at least one of the inwardly projecting roller-retaining edges, each extending partially the axial length thereof.

In the above-mentioned bearing structure, the roller-inserting groove may have a portion having a width, in cross section, slightly smaller than the smallest diameter of the end projection of the roller.

Further, the roller-inserting groove may have a dovetail-shaped cross section.

Moreover, as seen in FIG. 4C, one or more auxiliary roller-inserting grooves may be provided, if desired, at both sides of the roller-inserting groove partially cut into the inwardly projecting roller-retaining edge.

In the present invention each of the rollers has opposite ends each having a concave sidewall and a generally trapezoidal vertical cross section with the greatest diameter smaller than the diameter of the roller, hence as compared with the so-called T-face roller of prior art, each of the inwardly projecting roller-retaining edges of the present shell-type or annular outer ring can be made larger in dimension, while at the same time, the contact or abutting axial distances between the inner surfaces of the inwardly projecting roller-retaining edges and the end projections of rollers can be made greater, accordingly, the roller-retaining capacity of the annular outer ring of the present roller bearing can be markedly enhanced.

Since the inwardly projecting roller-retaining edges of the present invention each can be formed comparatively large in size, the dimension accuracy required in the working thereof is not so strict when the annular outer ring is manufactured, thus resulting in a substantial reduction of production cost of the shell-type bearing of the present invention.

DESCRIPTION OF PREFERRED EMBODIMENTS

Figure 1:
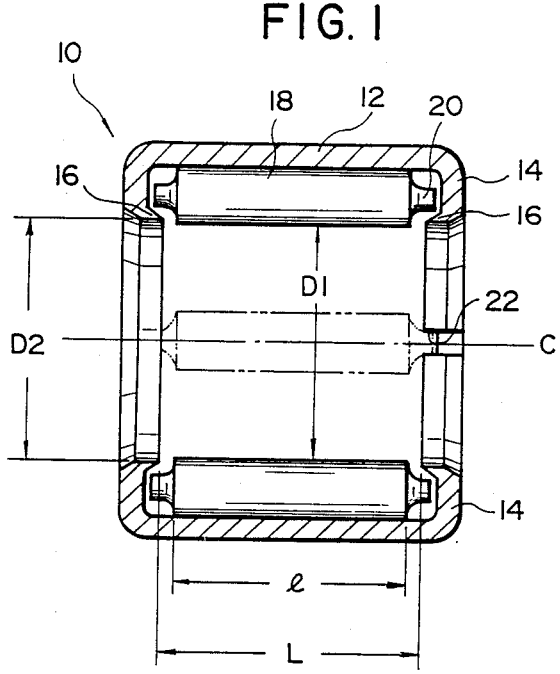
FIG. 1 is a front view, in section, illustrating an embodiment of the present invention.

Referring to FIGS. 1-4, explanation will be made regarding various embodiments of the present invention:

FIG. 1 is a vertical cross section of a roller bearing according to the present invention, wherein the entire bearing is represented by referential numeral 10, and the annular outer ring is represented by referential numeral 12. On both the axial ends of the annular outer ring 12 are integrally formed inside flanges 14, 14, projecting inwardly, at a right-angle relative to the longitudinal axial line C of the outer ring (FIGS. 1 and 2) and an inwardly projecting roller-retaining edge 16 is formed at the free end portion of each of said integral inside flanges 14. Namely, a pair of opposing roller-retaining edges 16 of an annular outer ring projects toward each other in parallel with the center or axial line C of the annular outer ring so as to form an internal peripheral annular space on the inner surface of the outer ring.

In the drawings, 18 is a roller, the end portions 20 of the roller 18 each are formed to have a concave sidewall and a generally trapezoidal vertical cross section with a flat top of a smaller diameter than the diameter of the roller 18, viz., the so-called dumbbel type roller.

The internal diameter D2 of the above-mentioned inwardly projecting roller-retaining edge 16 is made slightly larger than the diameter D1 of an inscribed circle defined by the rollers retained and filled up in the internal peripheral annular space of the annular outer ring, viz., the diameter D1 substantially corresponds to the diameter of a shaft to be inserted in the internal opening of the annular outer ring. The axial distance L between the pair of the opposing inwardly projecting roller-retaining edges 16, 16 of the outer ring 12 is made slightly larger than the axial length l of the body portion of the roller 18 viz., axial length of the contact area between the roller and the central shaft, when assembled.

At least one of the integral inside flanges of the annular outer ring 12 is provided with at least one roller-inserting groove 22 which is formed by partially cutting the inwardly projecting roller-retaining edge 16 in the axial direction of the outer ring. In the embodiment of FIG. 1, only one roller-inserting groove 22 is shown.

In the manufacture of the annular outer ring 12 is employed a multi-stage plastic working whereby the annular outer ring is made nearly to its finally finished configuration and dimension. In this connection, the inwardly projecting roller-retaining edges may be formed during the above-mentioned plastic working procedures and then heat-treated to a predetermined hardness, followed by barrel polishing operation for treating their surfaces to obtain a finished product.

Figure 2A:
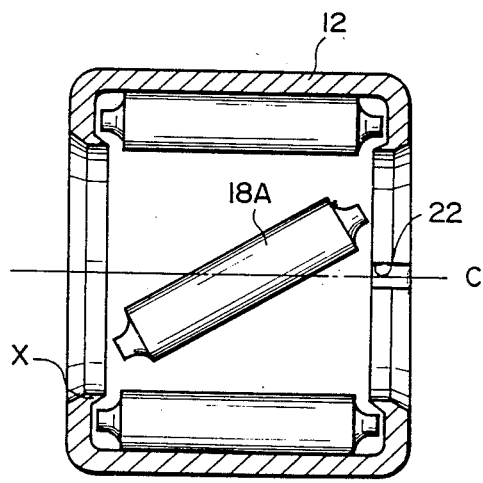
FIG. 2A is a front view, in section, illustrating how to assemble rollers with the annular outer ring.

Next, explanation will be made about the assembling of the rollers with the annular outer ring. Majority of the rollers to be filled-up in the annular outer ring can be assembled therewith without any difficulty in such a manner as shown in FIG. 2A, just by putting them one after another into the internal peripheral annular space of the annular outer ring while inclining each of the rollers relative to the center line or axis C of the annular outer ring until they have been filled in place. Only a few of the remaining rollers should be assembled with the annular outer ring 12 by forcing one end portion 20 of each of the remaining rollers thereinto through the inserting groove 22, as shown in FIG. 1 by a roller depicted by a dotted line until the insertion operation is completed to the last roller.

Figure 2B:
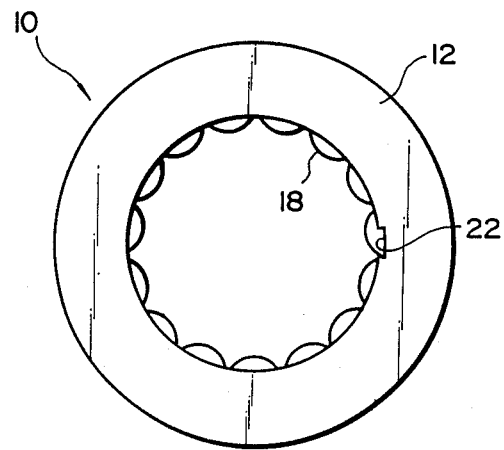
FIG. 2B is a side view of FIG. 1 as seen from the right-hand direction.
Figure 3:
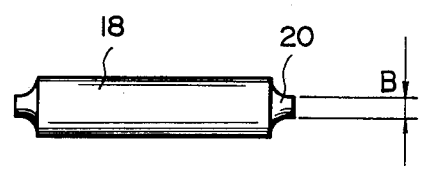
FIG. 3 illustrates an elevation of the roller used in the present invention, wherein each of FIG. 4A, 4B and 4C illustrates modified embodiment of the present invention.

FIG. 2B is a side view of the bearing 10 with a plurality of rollers 18 fully filled up therein as viewed from the side where on part of the inwardly projecting roller-retaining edge, a roller-inserting groove 22 is provided. In this case, both roller ends 20 abut or engage the inner surfaces of the opposing inwardly projecting roller-retaining edges 16 of the outer ring flanges, hence the rollers 18 located upwardly on FIG. 2B are prevented to fall down or come off therefrom. One of the above-mentioned rollers 18 is illustrated in FIG. 3, wherein the diameter of tip end of end projection 20 having the smallest diameter is represented by symbol B.

In each of FIGS. 1 and 2, the roller-inserting groove 22 is illustrated to have a square-shaped cross section but any other shapes in cross section may also be adopted.

Figure 4A:
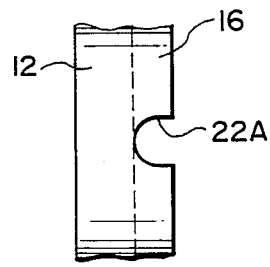

In FIG. 4A, the roller-inserting groove 22A is formed as a U-shaped cross-section. In the formation of the roller-inserting groove 22A having a U-shaped cross-section in the roller-retaining edge 16, a cutout having an inwardly, slightly tapered cross section is firstly formed therein before the outer ring flanges 14 (FIG. 1) as well as the inwardly projecting roller-retaining edges 16 are formed on the annular outer-ring 12, and then the roller-retaining edge 16 having said cutout is bent inwardly relative to the relevant outer ring flange to form the groove 22. The shape of the roller-inserting groove 22A according to the present invention is so simple that working thereof can be easily carried out with no difficulty.

Figure 4B:
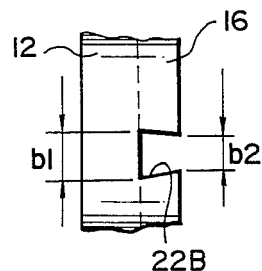

FIG. 4B illustrates a roller-inserting groove 22B having a dovetail-shaped cross section, which is so shaped that the bottom width b1 of the roller-inserting groove 22B is made slightly larger than the smallest diameter B of the tip end of each of the end projections of the roller, whereas the mouth width b2 in cross section of the groove 22B is sized slightly smaller than the smallest diameter B of the end projection. When the rollers are assembled within the internal peripheral annular space of the annular outer ring, the rollers each are forcibly pressed at one end projection 29 (see FIG. 3) thereof into and passed through the roller-inserting groove 22B while expanding the mouth width b2 of the inserting groove 22B due to resilient deformation thereof until the roller is put into the annular space, which precedure is repeated until the last roller has been assembled. Once the rollers have been put within and thus assembled with the annular outer ring 12, the end projections of rollers can no longer come off from the internal peripheral space of the annular outer ring 12 through the roller inserting groove 22B, because the mouth width b2 of the groove is made smaller than the smallest diameter B of the end projection of the roller.

Figure 4C:
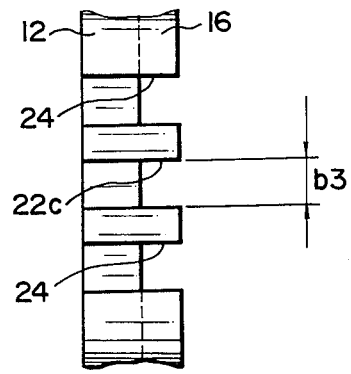
Figure 5:
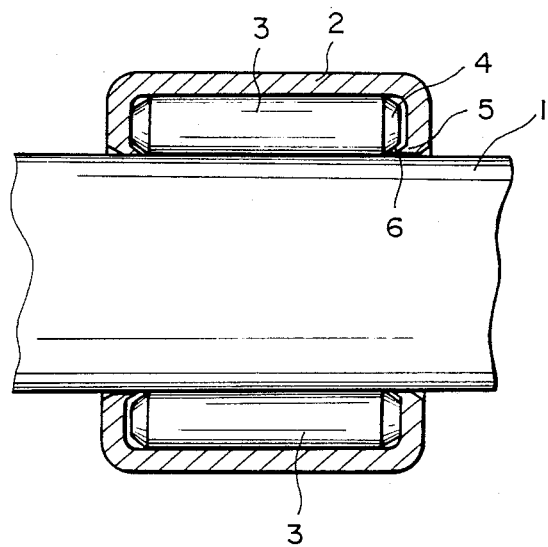
FIGS. 5 and 6 are front views, in section, of a prior art drawn cup bearing.
Figure 6:
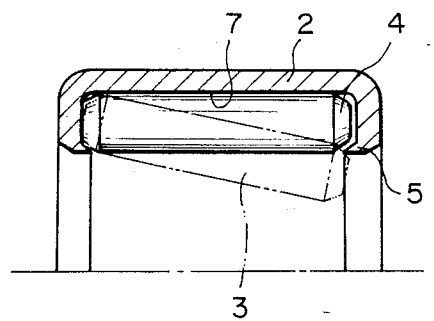

FIG. 4C shows a further modified embodiment of the present invention wherein the rollers assembled within the annular outer ring 12 are prevented from coming off from the roller-inserting groove wherein a plurality of auxiliary grooves 24, 24 are provided on both peripherally adjacent sides of the roller-inserting groove 22C on the relevant roller-retaining edge, thus enabling the roller-inserting groove 22C having a square cross section to be easily deformed due to resiliency upon the insertion of a roller therethrough.

The mouth width b3 of the roller-inserting groove 22C in FIG. 4C is made slightly larger than the smallest diameter B of the end projection of the roller but smaller than the greatest diameter at the foot of the end projection thereof. Upon assembling a roller into the annular outer ring 12, the roller-inserting groove 22C is resiliently deformed so that the roller-inserting groove 22 may be expanded in the cross section under forcible insertion at the foot portion of the end projection of the roller. Once all the rollers have thus been assembled with the annular outer ring they can no longer come off therefrom, because the mouth width b3 of the roller-inserting groove 22C is made smaller than the greatest diameter of the end projection of roller at its foot portion.

Thus, according to the present invention, the rollers can easily be assembled within the internal peripheral annular space of the outer ring 12 and once assembled, the rollers can no longer come off therefrom.

EFFECTS OF THE INVENTION

Effects of the present invention are summarized hereinbelow:

(1) According to the present invention, the roller-retaining capacity of the bearing can be greatly enhanced as compared with prior art drawn cup bearing and even without a shaft being inserted into the axial throughbore of the annular outer ring, the bearing with all the rollers filled up therein can be safely transported without the rollers coming off therefrom.

(2) In the working of the inwardly projecting roller-retaining edges in the outer ring flanges of the present bearing, no strict dimensional accuracy is required, thus resulting in a substantial reduction of the manufacturing cost.

(3) Due to the unique structure of the annular outer ring, rollers can easily be assembled therewith.

(4) Due to the above-mentioned number of advantages, the present bearing can be manufactured at a low cost.

What is claimed is:

1. A drawn cup roller bearing comprising an annular outer ring made of a thin steel sheet, and a number of rollers arranged closely side by side on the internal peripheral annular space of the annular outer ring wherein each of the rollers has at each of the ends an end projection having a concave side wall and a generally trapezoidal vertical cross section with the greatest diameter smaller than the diameter of the roller, inside flanges are integrally formed at the axially opposite ends, respectively, of the annular outer ring with an inwardly projecting roller-retaining edge being formed at and along each of the free ends of said inside flanges, thereby forming an internal peripheral annular space in the outer ring capable of retaining the rollers closely side by side in a filled-up fashion at their end projections supported by said inwardly projecting roller-retaining edges, and a roller-inserting groove is permanently formed in at least one of the inwardly projecting roller-retaining edges extending through to an inner and radial surface; and wherein the roller-insertting groove has a portion with a cross section slightly smaller than the smallest diameter of the end projection of the roller.

2. The roller bearing as claimed in the claim 1 wherein the roller-inserting groove has a dovetail-shaped cross section.

3. The roller bearing as claimed in claim 1 wherein one or more auxiliary grooves are provided peripherally sidewise the roller-inserting groove in the inwardly projecting edge.

4. The roller bearing as defined in claim 1 wherein said groove is formed by cutting said roller-retaining edge.

5. A drawn cup roller bearing comprising:
an annular outer ring;
a plurality of rollers, each of said rollers having at each of its ends an end projection having a concave side wall and a generally trapezoidal vertical cross section with the greatest diameter smaller than the diameter of the roller;
inside flanges on the axially opposite ends of the annular outer ring, including an inwardly projecting roller-retaining edge along each of the free ends of said inside flanges, thereby forming an internal peripheral annular space in said annular outer ring for retaining the rollers closely side-by-side and wherein each said end projection is supported by said inwardly projecting roller-retaining edges; and
a resiliently deformable roller-inserting groove that is not closed in at least one of the inwardly projecting roller-retaining edges extending through to an inner and radial surface, said groove having a portion with a cross section slightly smaller than the smallest diameter of the end projection of said rollers.

6. The roller bearing as defined in claim 5 wherein said groove is formed by cutting said roller-retaining edge.

7. A roller bearing comprising:
an annular outer ring;
a flange extending radially inward on each of the axially opposite ends of said outer ring;
a roller retaining edge on the free end of said flange, said edge extending toward the roller retaining edge on the flange on the other axially opposite end of said outer ring forming an annular space between said outer ring and said edge;
plural rollers capable of being inserted into said annular space in a side-by-side manner,
each of said rollers having at each of its axial ends and end projection generally in the shape of a frustrum of a right circular cone with concave side walls,
and with the larger base of each said conically shaped projection having a first diameter less than the diameter of said rollers,
and with the smaller base of each said conically shaped projection having a second diameter less than the smallest width of said annular space; and
one said roller retaining edge having a resiliently deformable roller-inserting groove that is not closed, said groove extending axially therethrough and having a smallest cross section less than said second diameter of said projection,
whereby said rollers may be inserted into said space by forcibly pushing one of said projections through said groove, and whereby said rollers may be held in said space by said edge and by the difference in size of said second diameter and the smallest cross section of said groove.

8. A roller bearing comprising:
plural rollers having end projections at their axial ends; and
a flanged annular ring for retaining said rollers, said ring having at each of its free ends edges overlying said projections when said rollers are in place,
said end projections having a largest diameter smaller than the diameter of said rollers, and
said edges having a groove therethrough that is not closed, said groove having a width smaller than the smallest diameter of said end projections, and extending through to an inner and radial surface; and
wherein said end projections have generally trapezoidally shaped longitudinal cross sections with concave side walls.

* * * * *